United States Patent
Kawaguchi et al.

[11] Patent Number: 5,589,429
[45] Date of Patent: Dec. 31, 1996

[54] ALUMINUM NITRIDE SINTERED BODY AND PROCESS FOR PRODUCING THE SAME

[75] Inventors: Kenzo Kawaguchi; Tetsuya Takemura; Hideki Matsubara; Sinya Takagi; Atsushi Kanda, all of Aichi, Japan

[73] Assignee: NGK Spark Plug Co., Ltd., Aichi, Japan

[21] Appl. No.: 364,497

[22] Filed: Dec. 27, 1994

[30] Foreign Application Priority Data

Dec. 27, 1993 [JP] Japan ................................. 5-352132

[51] Int. Cl.$^6$ .................................................. C04B 35/58
[52] U.S. Cl. .................... 501/96; 501/98; 501/152; 264/56
[58] Field of Search ........................... 501/96, 98, 153, 501/152; 264/60, 65, 56

[56] References Cited

U.S. PATENT DOCUMENTS

| | | | |
|---|---|---|---|
| 4,252,768 | 2/1981 | Perkins et al. | 501/97 |
| 4,327,187 | 4/1982 | Kamatsu et al. | 501/98 |
| 4,407,971 | 10/1983 | Kamatsu et al. | 501/97 |
| 4,412,009 | 10/1983 | Kamatsu et al. | 501/97 |
| 4,578,365 | 3/1986 | Huseby et al. | 501/96 |
| 4,997,798 | 3/1991 | Okuro et al. | 501/98 |
| 5,001,089 | 3/1991 | Kasori et al. | 501/98 |
| 5,126,293 | 6/1992 | Kasori et al. | 501/98 |
| 5,147,832 | 9/1992 | Shimada et al. | 501/96 |
| 5,219,803 | 6/1993 | Yamakawa et al. | 501/96 |
| 5,231,062 | 7/1993 | Mathers et al. | 501/96 |
| 5,293,509 | 3/1994 | Yamakawa et al. | 501/96 |
| 5,312,786 | 5/1994 | Namakawa et al. | 501/96 |
| 5,314,850 | 5/1994 | Miyahara | 501/98 |
| 5,320,990 | 6/1994 | Guiton et al. | 501/96 |
| 5,393,715 | 2/1995 | Nakahata et al. | 501/98 |

FOREIGN PATENT DOCUMENTS

| | | | |
|---|---|---|---|
| 0018925 | 6/1973 | Japan | 501/98 |
| 0026076 | 2/1983 | Japan | 581/96 |
| 0071575 | 4/1985 | Japan | 501/98 |
| 2124772 | 5/1990 | Japan . | |
| 313190 | 2/1991 | Japan . | |
| 3290371 | 12/1991 | Japan . | |

*Primary Examiner*—Paul Marcantoni
*Attorney, Agent, or Firm*—Sughrue, Mion, Zinn, Macpeak & Seas

[57] ABSTRACT

An aluminum nitride sintered body comprising aluminum nitride as a main component, a titanium compound, and an yttrium compound, wherein when the content of titanium and the content of yttrium both in terms of percentage by weight based on the aluminum nitride sintered body are plotted on an x-y coordinate system, with the titanium content as the x axis and the yttrium content as the y axis, the titanium content and the yttrium content each is within a region surrounded by the lines connecting points A and B, B and C, C and D, D and E, and E and A, inclusive of the lines the points A, B, C, D and E being:

A (0.2, 2.0)

B (0.2, 6.5)

C (1.0, 10.25)

D (2.2, 10.25)

E (2.2, 5.0).

7 Claims, 4 Drawing Sheets

ALUMINUM NITRIDE SINTERED BODY AND PROCESS FOR PRODUCING THE SAME

FIELD OF THE INVENTION

The present invention relates to an aluminum nitride sintered body and a process for producing the same. The aluminum nitride sintered body of the present invention can be advantageously utilized in the fields where high thermal conductivity and uniform blackness are required, such as, e.g., insulating substrates, heat sinks, and integrated circuit packages.

BACKGROUND OF THE INVENTION

Since aluminum nitride unites high thermal conductivity and high electrical insulating properties and is non-toxic, it is expected to be generally used in the fields enumerated above. Various kinds of aluminum nitride sintered bodies for use in these applications and processes for the production thereof have hence been proposed.

First, a process for producing an aluminum nitride sintered body having a surface capable of being directly metallized was disclosed in JP-B-3-13190 (the term "JP-B" as used herein means an "examined Japanese patent publication."), which process comprises adding 0.1 to 10 parts by weight of a Group 4a, 5a, or 6a element, e.g., Ti, to 100 parts by weight of aluminum nitride and sintering the mixture at ordinary pressure in a non-oxidizing atmosphere having a boron source. In JP-A-2-124772 (the term "JP-A" as used herein means an "unexamined published Japanese patent application.") was thereafter disclosed a process for producing a black aluminum nitride sintered body having a thermal conductivity of 150 W/m·K or higher which comprises preparing an aluminum nitride powder regulated to have an oxygen content of 0.5 to 2.5 wt % as the main ingredient, adding 0.01 to 1.0 wt % $TiO_2$ in terms of the amount of Ti and 0.01 to 1.0 wt % $Y_2O_3$ as a sintering aid to the aluminum nitride powder, and sintering the mixture in a non-oxidizing atmosphere.

The present inventors also disclosed in JP-A-3-290371 a process for producing a black aluminum nitride sintered body having no irregular color which comprises mixing 100 parts by weight of aluminum nitride with 0.1 to 10 parts by weight of $TiO_2$ as a colorant and a small amount of $Y_2O_3$ as a sintering aid, forming the mixture to prepare a green body, calcining the formed green body, and then sintering the calcined body in a non-oxidizing atmosphere.

However, in JP-B-3-13190 and JP-A-2-124772, optimum conditions for producing a black sintered body having no irregular color are not disclosed. Hence, when conditions within the ranges disclosed in these references are used to produce sintered bodies, there are cases where the sintered bodies have irregular color, resulting in a low yield because of the appearance defect. JP-A-3-290371 also failed to elucidate the optimum amount of the sintering aid and appropriate conditions for calcining. Because of this, there are cases where the sintered bodies produced by this prior art technique have been insufficiently densified or suffer bleeding of the sintering aid, although they are black.

SUMMARY OF THE INVENTION

An object of the present invention is to provide an aluminum nitride sintered body having high thermal conductivity and a sufficiently black satisfactory appearance with no irregular color and a process for producing the sintered body by regulating not only the composition of the raw material but also optimum production conditions including calcining conditions.

DETAILED DESCRIPTION OF THE INVENTION

Figure 1:
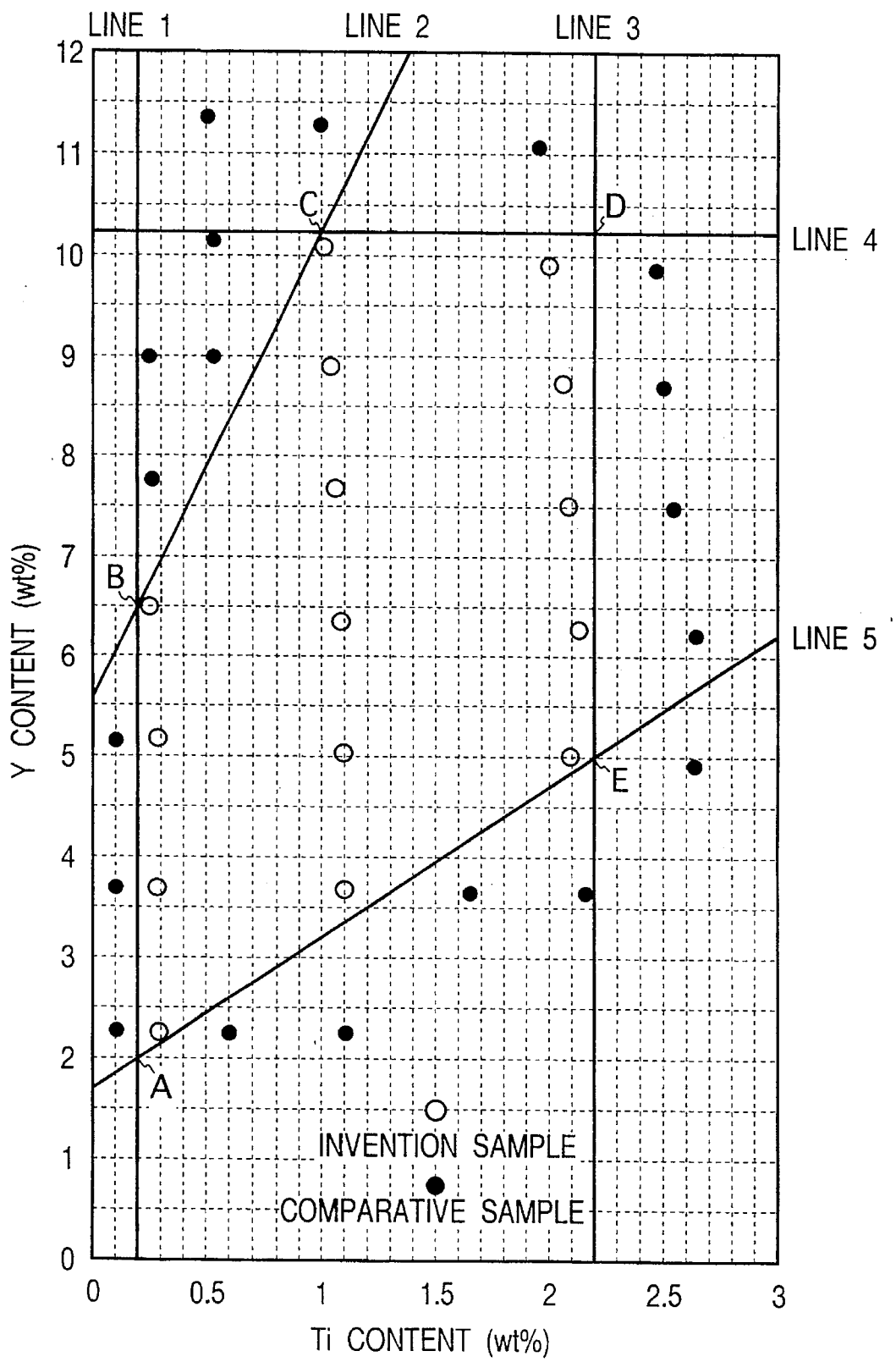
FIG. 1 is a graph showing the relationships between titanium content and yttrium content in sintered bodies based on the amount of aluminum nitride.

The first means for accomplishing the above-described object of the present invention resides in an aluminum nitride sintered body comprising aluminum nitride as a main component, a titanium compound, and an yttrium compound, wherein when the content of titanium and the content of yttrium both in terms of percentage by weight based on the aluminum nitride sintered body are plotted on an x-y coordinate system as in FIG. 1, with the titanium content as the x axis and the yttrium content as the y axis, the titanium content and the yttrium content each is within a region surrounded by the lines connecting points A and B, B and C, C and D, D and E, and E and A, inclusive of the lines, the coordinates (x, y) of the points A, B, C, D and E being:

A (0.2, 2.0)

B (0.2, 6.5)

C (1.0, 10.25)

D (2.2, 10.25)

E (2.2, 5.0).

The titanium compound contained in the aluminum nitride sintered body described above is usually TiN. However, the titanium compound should not be construed as being limited thereto, and other examples thereof include $TiO_2$, Ti-O-N compounds, and Ti. Examples of the yttrium compound usually include Y-Al-O compounds called YAG, YAL, and YAM such as, e.g., $Y_3Al_5O_{12}$, $YAlO_3$, and $Y_4A_2O_9$, but the yttrium compound should not be construed as being limited thereto.

Figure 2:
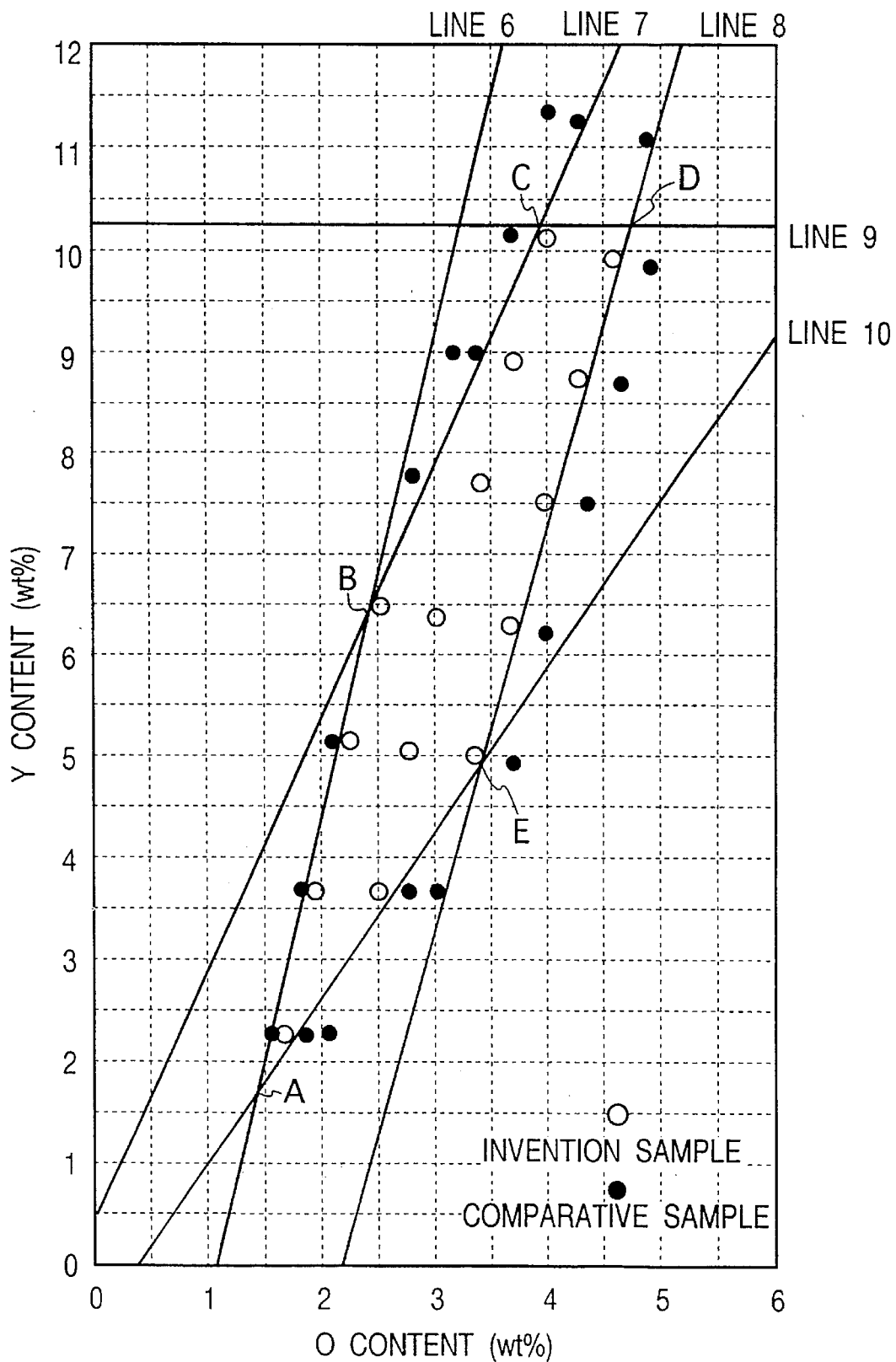
FIG. 2 is a graph showing the relationships between oxygen content and yttrium content in sintered bodies based on the amount of aluminum nitride.

The second means for accomplishing the object of the present invention resides in an aluminum nitride sintered body comprising aluminum nitride as a main component, a titanium compound, and an Y-Al-O compound, wherein when the content of oxygen and the content of yttrium both in terms of percentage by weight based on the aluminum nitride sintered body are plotted on an x-y coordinate system as in FIG. 2, with the oxygen content as the x axis and the yttrium content as the y axis, the oxygen content and the yttrium content each is within a region surrounded by the lines connecting points A and B, B and C, C and D, D and E, and E and A, exclusive of the lines, the coordinates (x, y) of the points A, B, C, D and E being:

A (1.4, 1.7)

B (2.4, 6.4)

C (3.9, 10.25)

D (4.75, 10.25)

E (3.4, 4.9).

Figure 3:
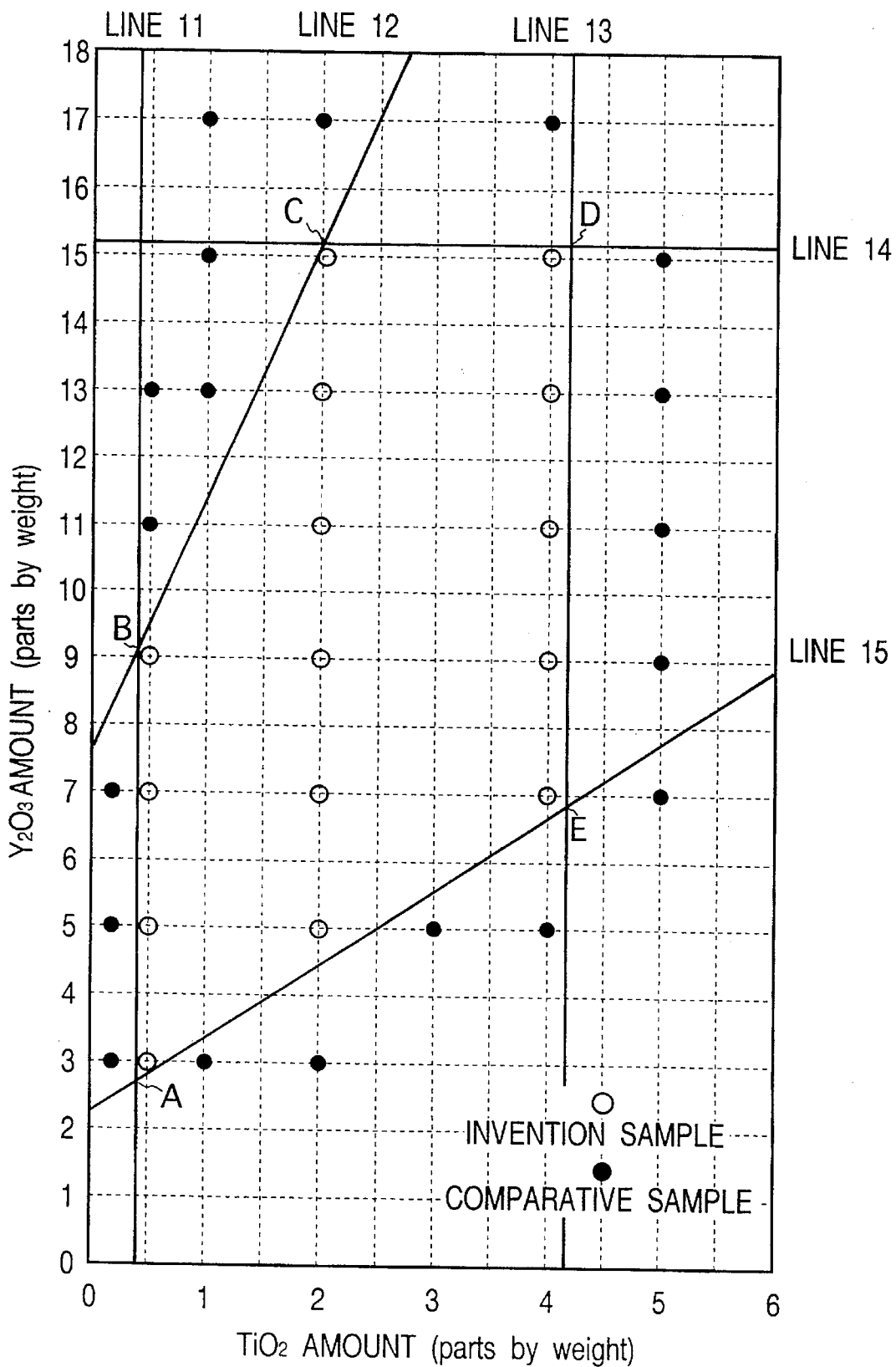
FIG. 3 is a graph showing the relationships between titania amount and yttria amount in raw materials based on the amount of aluminum nitride.

The sintered bodies characterized as the first and second means can be produced by the first process which comprises:

mixing an aluminum nitride powder as a main ingredient with a titanium compound, an yttrium compound, and an organic binder, forming the mixture to prepare a green body, calcining the formed green body, and then sintering the calcined body in a non-oxidizing atmosphere, wherein the titanium compound and the yttrium compound are added in such amounts that when the titanium compound amount and the yttrium compound amount in terms of the amount of titania ($TiO_2$) and the amount of yttria ($Y_2O_3$), respectively, per 100 parts by weight of the aluminum nitride powder are plotted on an x-y coordinate system as in FIG. 3, with the titanium compound amount as the x axis and the yttrium compound amount as the y axis both in terms of parts by weight, the titanium compound amount and the yttrium compound amount each is within a region surrounded by the lines connecting the points A and B, B and C, C and D, D and E, and E and A, inclusive of the lines, the coordinates (x, y) of the points A, B, C, D and E being:

A (0.4, 2.75)

B (0.4, 9.1)

C (2.0, 15.15)

D (4.2, 15.15)

E (4.2, 6.9).

In the above process, the calcining is preferably conducted under such conditions that the calcined body has a residual carbon content of 0.3% by weight or lower.

Figure 4:
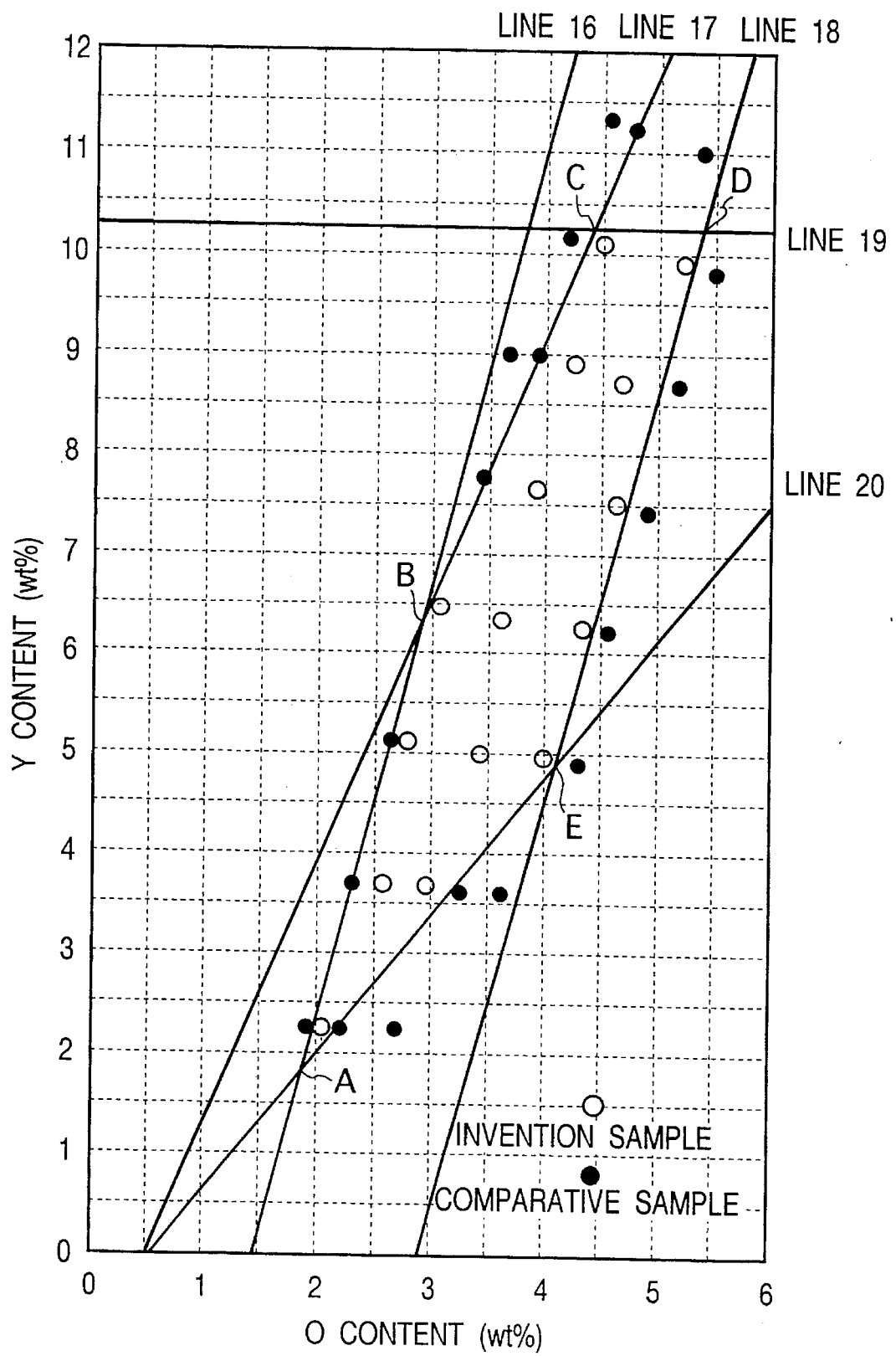
FIG. 4 is a graph showing the relationships between oxygen content and yttrium content in calcined bodies based on the amount of aluminum nitride.

The sintered bodies can also be produced by the second process which comprises:

mixing an aluminum nitride powder as a main ingredient with a titanium compound, an yttrium compound, and an organic binder, forming the powder mixture to prepare a green body, calcining the formed green body, and then sintering the calcined body in a non-oxidizing atmosphere, wherein the calcining is conducted under such conditions that the calcined body has a residual carbon content of 0.3% by weight or lower and that when the contents of oxygen and yttrium in the calcined body are plotted on an x-y coordinate system as in FIG. 4, with the oxygen content as the x axis and the yttrium content as the y axis both in terms of percentage by weight, the oxygen content and the yttrium content each is within the region surrounded by the lines connecting points A and B, B and C, C and D, D and E, and E and A, exclusive of the lines, the coordinates (x, y) of the points A, B, C, D and E being:

A (1.85, 1.8)

B (2.9, 6.3)

C (4.4, 10.25)

D (5.3, 10.25)

E (4.1, 4.9).

In the above processes, the aluminum nitride powder as a main ingredient has an average particle size of from 1.0 to 3.0 μm. If it is below 1.0 μm, it is difficult to remove the binder component sufficiently by heat. On the other hand, if it is above 3.0 μm, the density of sintered body is lowered and more high temperature is required for sintering.

In the above process, the forming is preferably conducted by pressing or tape forming. Concretely, the pressing or tape forming is conducted as follows.

(1) Pressing: A powder for forming which is granulated by spray drying is packed into a mold and pressed at a pressure of from 500 to 2000 kg/cm² (usually around 1500 kg/cm²) with a press machine.

An example of components contained in the powder for forming other than the aluminum nitride powder, the titanium compound and the yttrium compound is described below with the amount thereof (percentage by weight based on the aluminum nitride powder), but not limited thereto.

Acrylate resin (binder) . . . 2.0%

Polyvinyl alcohol (binder) . . . 0.8%

Montanic acid ester wax (lubricant) . . . 0.8%

Alkyl phosphate (mold release agent) . . . 0.4%

(2) Tape forming: Raw materials are compounded in respective amounts to make a slurry having a viscosity of from 1 to 100 poise, with which a green sheet is formed by a doctor blade method. The resulting green sheets are laminated to cut to a prescribed size.

An example of components contained in the raw materials for tape forming other than the aluminum nitride powder, the titanium compound and the yttrium compound is described below with the amount thereof (percentage by weight based on the aluminum nitride powder), but not limited thereto.

Polyvinylbutyral resin (binder) . . . 13.0%

Dibutylphthalate . . . 4.5%

Dioctylphthalate . . . 3.0%

In the above processes, the calcining is conducted at a temperature of from 300° to 600° C., preferably from 450° to 550° C., more preferably 500° C., and for not less than 1 hour, more preferably 2 hours.

In the above processes, the non-oxidizing atmosphere is especially preferably an atmosphere of either nitrogen or a mixed gas containing nitrogen, although other inert gases are usable. The atmosphere may be pressurized or not. The sintering temperature is usually from 1,600° to 1,900° C., with temperatures around 1,700° C. being optimal.

First Means

In FIG. 1, sintered bodies within the area on the left side of line 1 are insufficient in coloring because of too small Ti amounts. Sintered bodies within the area above line 2 (the area in which Y content is high and Ti content is low) have a reduced thermal conductivity because part of the $Y_2O_3$ added remains unreacted due to too large amounts of $Y_2O_3$ added relative to $TiO_2$ amounts. Sintered bodies within the area on the right side of line 3 have unevenness of color because of too large Ti amounts. Sintered bodies within the area above line 4 not only have a reduced thermal conductivity because of too large proportions of a secondary phase due to too large amounts of $Y_2O_3$ added, but also suffer bleeding. Sintered bodies within the area below line 5 have a reduced thermal conductivity because of the oxygen which remained untrapped by the $Y_2O_3$ due to too large amounts of $TiO_2$ added relative to $Y_2O_3$ amounts and which has been incorporated into the AlN to form a solid solution.

Second Means

In FIG. 2, sintered bodies within the area on the left side of line 6 are insufficient in coloring because of too small amounts of $TiO_2$ added. Sintered bodies within the area on the left side of line 7 have a reduced thermal conductivity because part of the $Y_2O_3$ added remains unreacted due to too large amounts of Y relative to amounts of O. Sintered bodies within the area on the right side of line 8 have unevenness of color because of too large amounts of $TiO_2$ added. Sintered bodies within the area above line 9 not only have a reduced thermal conductivity because of too large proportions of a secondary phase due to too large amounts of $Y_2O_3$ added, but also suffer bleeding. Sintered bodies within the area below line 10 have a reduced thermal conductivity because of the oxygen which remained untrapped due to too large amounts of O relative to amounts of Y and which has been incorporated into the AlN to form a solid solution.

First Process

In FIG. 3, conditions within the area on the left side of line 11 result in insufficient coloring because of too small $TiO_2$ amounts. Conditions within the area above line 12 result in reduced thermal conditions because part of the $Y_2O_3$ added remains unreacted due to too large $Y_2O_3$ amounts relative to $TiO_2$ amounts. Conditions within the area on the right side of line 13 result in unevenness of color because of too large $TiO_2$ amounts. Conditions within the area above line 14 result not only in reduced thermal conductivities because of too large proportions of a secondary phase due to too large $Y_2O_3$ amounts, but also in bleeding. Conditions within the area below line 15 result in reduced thermal conductivities because of the oxygen which remains untrapped by the $Y_2O_3$ due to too large $TiO_2$ amounts relative to $Y_2O_3$ amounts and which is incorporated into the AlN to form a solid solution.

Second Process

In FIG. 4, conditions within the area on the left side of line 16 result in insufficient coloring because of too small amounts of $TiO_2$ added. Conditions within the area on the left side of line 17 result in reduced thermal conductivities because part of the $Y_2O_3$ added remains unreacted due to too large amounts of Y relative to amounts of O. Conditions within the area on the right side of line 18 result in unevenness of color because of too large amounts of $TiO_2$ added. Conditions within the area above line 19 result not only in reduced thermal conductivities because of too large proportions of a secondary phase due to too large amounts of $Y_2O_3$ added, but also in bleeding. Conditions within the area below line 20 result in reduced thermal conductivities because of the oxygen which remains untrapped by the $Y_2O_3$ due to too large amounts of O relative to amounts of Y and which is incorporated into the AlN to form a solid solution.

If the residual carbon content in the calcined body exceeds 0.3% by weight, the carbon inhibits sintering.

The present invention will be explained below in more detail by reference to the following Examples, but the invention should not be construed as being limited thereto.

EXAMPLE 1

In this example are described experiments carried out for determining the optimum ranges of raw-material composition and corresponding sintered body composition.

To 100 parts by weight of an aluminum nitride powder having an average particle size of 1.8 μm and an oxygen content of 0.8 wt % were added a titania ($TiO_2$) powder and an yttria ($Y_2O_3$) powder in respective amounts shown in Table 1. Thereto were further added an organic binder, a lubricant, and a dispersant. This mixture was homogenized by wet mixing and then granulated by spray drying. The granules obtained were packed into a mold and pressed into a predetermined shape at a pressure of 1,500 kg/cm². This formed green body was calcined by heating it at 500° C. for 2 hours in the air, and then sintered by heating it at 1,700° C. for 6 hours at ordinary pressure in a nitrogen atmosphere. Thus, aluminum nitride sintered bodies respectively having the compositions of samples Nos. 1 to 34 were produced. These sintered bodies were subjected to the following analyses and examinations.

FIG. 3 is the graph in which the amounts of the titania ($TiO_2$) powder and yttria ($Y_2O_3$) powder added were plotted. In the figure, the open circles indicate examples within the scope of the invention, while the solid circles indicate examples outside the scope of the invention; the open circles and the solid circles correspond to the ratings ○ and x, respectively, in the evaluation described later.

Compositional Analysis of Calcined Body

The contents of yttrium and titanium in a calcined body were determined by chemical analysis. The residual carbon content in the calcined body was determined by burning the calcined body in an oxygen stream, measuring the amounts of the carbon monoxide and carbon dioxide generated, and calculating the residual carbon content from the total of these amounts. The content of oxygen was determined by placing the calcined body in a graphite crucible, rapidly heating the body to 2,700° to 3,000° C. in a helium (He) carrier to allow carbon monoxide (CO) to generate, oxidizing this CO into $CO_2$, measuring the amount of the $CO_2$, and calculating the oxygen content from the $CO_2$ amount. This method was employed because, by the rapid heating to 2,700° to 3,000° C., not only the free oxygen in the calcined body is converted into CO, but also the other oxygen, which is in the form of compounds with metal elements, is thought to be converted into CO by pyrolysis.

FIG. 4 is the graph in which the contents of oxygen and yttrium in the calcined bodies were plotted. In the figure, the open circles indicate examples within the scope of the invention, while the solid circles indicate examples outside the scope of the invention; the open circles and the solid circles correspond to the ratings ○ and x, respectively, in the evaluation described later.

Analysis of Sintered Body for Determining Composition and Constituent Phases

The contents of yttrium and titanium in a sintered body were determined by chemical analysis, while the content of oxygen (O) was determined by the above-described method in which the amount of O is measured after the oxygen is converted into $CO_2$. The identification of the constituent phases was conducted by X-ray diffraction. As a result, all the sintered bodies were found to contain aluminum nitride and titanium nitride as constituent phases and further contain an Y-Al-O compound. With respect to the Y-Al-O compounds, the individual crystal names are shown in Table 1, wherein YAG, YAL, and YAM indicate $Y_3Al_5O_{12}$, $YAlO_3$, and $Y_4A_2O_9$, respectively.

FIG. 1 is the graph in which the contents of titanium and yttrium in the sintered bodies were plotted, while FIG. 2 is the graph in which the contents of oxygen and yttrium in the sintered bodies were plotted. In these figures, the open circles indicate examples within the scope of the invention, while the solid circles indicate examples outside the scope of the invention; the open circles and the solid circles correspond to the ratings ○ and x, respectively, in the evaluation described later.

Measurement of Thermal Conductivity

The thermal conductivity of a sintered body was determined by cutting the sintered body into a disk form having a diameter of 10 mm and a thickness of 3 mm, subjecting the disk to flat grinding, and measuring the thermal conductivity thereof by the laser flash method.

Hue of Sintered Body and Examination for Bleeding

A sintered body having dimensions of 48×48×1.2 mm was examined visually and with a stereomicroscope to determine the hue and judge the occurrence or nonoccurrence of bleeding.

Evaluation

After the determinations and appearance examination described above, the results for each sintered body were collectively considered to evaluate the sintered body. That is, the sintered bodies having a thermal conductivity of 150 W/m·K or higher and also having an evenly black appearance with no bleeding were rated as ○ (satisfactory) and the other sintered bodies were rated as x (unsatisfactory). The evaluation results obtained are summarized in Table 1.

TABLE 1

| Sample No. | Formulation (parts by weight) | | Composition of Calcined Body (wt %) | | | | Composition of Sintered Body and Constituent Phase (wt %) | | | | Sintered Body Property | | | Evaluation |
|---|---|---|---|---|---|---|---|---|---|---|---|---|---|---|
| | $Y_2O_3$ | $TiO_2$ | Y | Ti | O | Residual C | Y | Ti | O | Constituent phase | Thermal conductivity (W/m·K) | Appearance Hue | Bleeding | |
| 1 | 3 | 0.2 | 2.26 | 0.12 | 1.93 | 0.07 | 2.29 | 0.12 | 1.45 | YAG + YAL | 175 | gray | not occured | x |
| 2 | 3 | 0.5 | 2.26 | 0.29 | 2.04 | 0.07 | 2.29 | 0.29 | 1.50 | YAG | 170 | black | not occured | o |
| 3 | 3 | 1.0 | 2.26 | 0.58 | 2.22 | 0.07 | 2.28 | 0.59 | 1.70 | YAG | 140 | " | not occured | x |
| 4 | 3 | 2.0 | 2.26 | 1.11 | 2.71 | 0.08 | 2.28 | 1.12 | 2.05 | YAG | 80 | " | not occured | x |
| 5 | 5 | 0.2 | 3.71 | 0.11 | 2.31 | 0.07 | 3.69 | 0.11 | 1.78 | YAL + YAM | 180 | gray | not occured | x |
| 6 | 5 | 0.5 | 3.71 | 0.28 | 2.55 | 0.08 | 3.71 | 0.28 | 1.90 | YAL + YAM | 175 | black | not occured | o |
| 7 | 5 | 2.0 | 3.69 | 1.10 | 2.95 | 0.08 | 3.68 | 1.11 | 2.45 | YAG | 160 | " | not occured | o |
| 8 | 5 | 3.0 | 3.64 | 1.64 | 3.23 | 0.08 | 3.65 | 1.66 | 2.71 | YAG | 105 | " | not occured | x |
| 9 | 5 | 4.0 | 3.61 | 2.15 | 3.59 | 0.07 | 3.62 | 2.17 | 3.05 | YAG | 60 | " | not occured | x |
| 10 | 7 | 0.2 | 5.14 | 0.11 | 2.67 | 0.08 | 5.14 | 0.11 | 2.11 | YAL + YAM | 180 | gray | not occured | x |
| 11 | 7 | 0.5 | 5.13 | 0.28 | 2.79 | 0.08 | 5.14 | 0.28 | 2.23 | YAL + YAM | 175 | black | not occured | o |
| 12 | 7 | 2.0 | 5.02 | 1.09 | 3.47 | 0.08 | 5.04 | 1.10 | 2.80 | YAL + YAG | 165 | " | not occured | o |
| 13 | 7 | 4.0 | 4.98 | 2.09 | 3.98 | 0.08 | 4.99 | 2.10 | 3.40 | YAG | 150 | " | not occured | o |
| 14 | 7 | 5.0 | 4.90 | 2.64 | 4.30 | 0.08 | 4.94 | 2.64 | 3.71 | YAG | 90 | uneven black | occured | x |
| 15 | 9 | 0.5 | 6.47 | 0.26 | 3.07 | 0.08 | 6.47 | 0.26 | 2.54 | YAM | 175 | black | not occured | o |
| 16 | 9 | 2.0 | 6.34 | 1.08 | 3.61 | 0.09 | 6.36 | 1.09 | 3.05 | YAL + YAM | 170 | " | not occured | o |
| 17 | 9 | 4.0 | 6.25 | 2.10 | 4.30 | 0.08 | 6.27 | 2.14 | 3.70 | YAL + YAG | 150 | " | not occured | o |
| 18 | 9 | 5.0 | 6.21 | 2.61 | 4.54 | 0.09 | 6.22 | 2.64 | 4.00 | YAL + YAG | 120 | uneven black | occured | x |
| 19 | 11 | 0.5 | 7.77 | 0.27 | 3.46 | 0.07 | 7.77 | 0.27 | 2.84 | YAM + $Y_2O_3$ | 145 | black | not occured | x |
| 20 | 11 | 2.0 | 7.67 | 1.06 | 3.96 | 0.08 | 7.69 | 1.07 | 3.41 | YAL + YAM | 165 | " | not occured | o |
| 21 | 11 | 4.0 | 7.53 | 2.05 | 4.59 | 0.08 | 7.51 | 2.09 | 4.01 | YAL | 155 | " | not occured | o |
| 22 | 11 | 5.0 | 7.45 | 2.54 | 4.91 | 0.08 | 7.49 | 2.55 | 4.39 | YAL + YAG | 125 | uneven black | occured | x |
| 23 | 13 | 0.5 | 9.01 | 0.26 | 3.72 | 0.07 | 9.01 | 0.26 | 3.19 | YAM + $Y_2O_3$ | 140 | black | not occured | x |
| 24 | 13 | 1.0 | 8.98 | 0.53 | 3.96 | 0.07 | 9.00 | 0.53 | 3.40 | YAM + $Y_2O_3$ | 145 | " | not occured | x |
| 25 | 13 | 2.0 | 8.90 | 1.02 | 4.29 | 0.08 | 8.90 | 1.04 | 3.74 | YAL + YAM | 160 | " | not occured | o |
| 26 | 13 | 4.0 | 8.72 | 2.04 | 4.71 | 0.08 | 8.73 | 2.07 | 4.30 | YAL + YAM | 155 | " | not occured | o |
| 27 | 13 | 5.0 | 8.68 | 2.51 | 5.20 | 0.09 | 8.70 | 2.51 | 4.68 | YAL | 140 | uneven black | occured | x |
| 28 | 15 | 1.0 | 10.15 | 0.52 | 4.21 | 0.08 | 10.15 | 0.52 | 3.71 | YAM + $Y_2O_3$ | 140 | black | not occured | x |
| 29 | 15 | 2.0 | 10.10 | 0.99 | 4.49 | 0.08 | 10.12 | 1.00 | 4.00 | YAM | 150 | " | not occured | o |
| 30 | 15 | 4.0 | 9.93 | 2.00 | 5.18 | 0.07 | 9.91 | 2.01 | 4.61 | YAL + YAM | 150 | " | not occured | o |
| 31 | 15 | 5.0 | 9.81 | 2.44 | 5.50 | 0.08 | 9.85 | 2.47 | 4.92 | YAL + YAM | 140 | uneven black | occured | x |
| 32 | 17 | 1.0 | 11.32 | 0.51 | 4.57 | 0.07 | 11.35 | 0.51 | 4.02 | YAM + $Y_2O_3$ | 120 | black | " | x |
| 33 | 17 | 2.0 | 11.21 | 1.01 | 4.79 | 0.08 | 11.24 | 1.00 | 4.29 | YAM + $Y_2O_3$ | 125 | " | " | x |
| 34 | 17 | 4.0 | 11.00 | 1.98 | 5.37 | 0.08 | 11.07 | 1.97 | 4.89 | YAL + YAM | 125 | " | " | x |

As shown in Table 1, all the samples within the scope of the present invention were rated as ○, whereas all the samples outside the scope of the invention were rated as x because these samples were inferior in either thermal conductivity or appearance. A detailed explanation of the results for the latter samples is as follows.

Samples Nos. 1, 5, and 10 had a high thermal conductivity and no bleeding, but they had been insufficiently blackened because of the deficiency of Ti as a colorant (left side of line 1 in FIG. 1 or of line 11 in FIG. 3).

Samples Nos. 3, 4, 8, and 9 had an even black color and no bleeding, but the thermal conductivities thereof were lower than 150 W/m·K because the oxygen contents in the sintered bodies were too high as compared with the yttrium contents (below line 10 in FIG. 2) due to the too high oxygen contents in the calcined bodies as compared with the yttrium contents (below line 20 in FIG. 4).

Samples Nos. 19, 23, 24, and 28 had an even black color and no bleeding, but the thermal conductivities thereof were lower than 150 W/m·K because yttria, which has low thermal conductivity, remained unreacted in the sintered bodies due to the too high yttrium contents in the calcined bodies as compared with the oxygen contents (above line 17 in FIG. 4) as a result of the too large yttria amounts in the raw materials as compared with the titania amounts (above line 12 in FIG. 3).

Samples Nos. 14, 18, 22, 27, and 31 had a black color, but the thermal conductivities thereof were lower than 150 W/m·K because the oxygen contents in the sintered bodies were too high as compared with the yttrium contents (right side of line 8 in FIG. 2) due to the too high oxygen contents in the calcined bodies as compared with the yttrium contents (right side of line 18 in FIG. 4). In addition, unevenness of color and bleeding occurred because the amounts of Ti as a colorant were too large (right side of line 3 in FIG. 1 or of line 13 in FIG. 3).

Samples Nos. 32, 33, and 34 had a thermal conductivity lower than 150 W/m·K, because yttria, which has low thermal conductivity, remained unreacted in the sintered bodies or Y-Al-O compounds (YAL and YAM) formed in large amounts due to the too large yttria amounts (above line 4 in FIG. 1, line 9 in FIG. 2, line 14 in FIG. 3, or line 19 in FIG. 4). In addition, bleeding occurred.

EXAMPLE 2

In this example are described experiments carried out for determining optimum conditions for calcining. Sintered bodies were produced and evaluated under the same conditions as in Example 1 except that the formulations for raw material preparation and the calcining temperatures were changed to those shown in Table 2. The evaluation results obtained are summarized in Table 2. With respect to sample No. 6, the same data as in Example 1 are given in the table.

TABLE 2

| Sample No. | Formulation (parts by weight) $Y_2O_3$ | Formulation (parts by weight) $TiO_2$ | Calcining Temperature (°C.) | Composition of Calcined Body (wt %) Y | Composition of Calcined Body (wt %) Ti | Composition of Calcined Body (wt %) O | Composition of Calcined Body (wt %) Residual C | Composition of Sintered Body and Constituent Phase (wt %) Y | Composition of Sintered Body and Constituent Phase (wt %) Ti | Composition of Sintered Body and Constituent Phase (wt %) O | Composition of Sintered Body and Constituent Phase (wt %) Constituent phase | Sintered Body Property Thermal conductivity (W/m·K) | Sintered Body Property Appearance Hue | Sintered Body Property Appearance Bleeding | Evaluation |
|---|---|---|---|---|---|---|---|---|---|---|---|---|---|---|---|
| 35 | 5 | 0.5 | 250 | 3.69 | 0.28 | 2.72 | 0.51 | 3.70 | 0.28 | 1.57 | — | unable to be measured | unable to be measured | unable to be measured | x |
| 36 | 5 | 0.5 | 300 | 3.70 | 0.28 | 2.55 | 0.15 | 3.71 | 0.28 | 1.88 | YAL + YAM | 175 | black | not occured | o |
| 6 | 5 | 0.5 | 500 | 3.71 | 0.28 | 2.55 | 0.08 | 3.71 | 0.28 | 1.90 | YAL + YAM | 175 | " | not occured | o |
| 37 | 5 | 0.5 | 600 | 3.71 | 0.28 | 2.54 | 0.05 | 3.71 | 0.28 | 1.90 | YAL + YAM | 175 | " | not occured | o |
| 38 | 5 | 0.5 | 700 | 3.58 | 0.27 | 4.20 | 0.04 | 3.60 | 0.28 | 3.68 | YAG | 30 | uneven black | occured | x |
| 39 | 7 | 0.5 | 250 | 5.10 | 0.28 | 2.95 | 0.48 | 5.11 | 0.28 | 1.94 | — | unable to be measured | unable to be measured | unable to be measured | x |
| 40 | 7 | 0.5 | 300 | 5.13 | 0.28 | 2.80 | 0.15 | 5.13 | 0.28 | 2.20 | YAL + YAM | 175 | black | not occured | o |
| 11 | 7 | 0.5 | 500 | 5.13 | 0.28 | 2.79 | 0.08 | 5.14 | 0.28 | 2.23 | YAL + YAM | 175 | " | not occured | o |
| 41 | 7 | 0.5 | 600 | 5.13 | 0.28 | 2.78 | 0.05 | 5.13 | 0.28 | 2.23 | YAL + YAM | 175 | " | not occured | o |
| 42 | 7 | 0.5 | 700 | 5.05 | 0.26 | 4.68 | 0.04 | 5.08 | 0.27 | 4.12 | YAG | 60 | uneven black | occured | x |
| 43 | 9 | 0.5 | 250 | 6.41 | 0.26 | 3.24 | 0.55 | 6.45 | 0.26 | 2.21 | — | unable to be measured | unable to be measured | unable to be measured | x |
| 44 | 9 | 0.5 | 300 | 6.45 | 0.26 | 3.08 | 0.15 | 6.47 | 0.26 | 2.47 | YAM | 175 | black | not occured | o |

TABLE 2-continued

| Sample No. | Formulation (parts by weight) | | Calcining Temperature (°C.) | Composition of Calcined Body (wt %) | | | | Composition of Sintered Body and Constituent Phase (wt %) | | | | Sintered Body Property | | | |
|---|---|---|---|---|---|---|---|---|---|---|---|---|---|---|---|
| | | | | | | Residual | | | | | | Thermal conductivity | Appearance | | Evaluation |
| | $Y_2O_3$ | $TiO_2$ | | Y | Ti | O | C | Y | Ti | O | Constituent phase | (W/m·K) | Hue | Bleeding | |
| 15 | 9 | 0.5 | 500 | 6.47 | 0.26 | 3.07 | 0.08 | 6.47 | 0.26 | 2.51 | YAM | 175 | " | not occured | o |
| 45 | 9 | 0.5 | 600 | 6.46 | 0.26 | 3.07 | 0.05 | 6.48 | 0.26 | 2.50 | YAM | 175 | " | not occured | o |
| 46 | 9 | 0.5 | 700 | 6.39 | 0.24 | 4.98 | 0.04 | 6.40 | 0.25 | 4.50 | YAG | 80 | uneven black | occured | x |

As shown in Table 2, all the samples within the scope of the present invention were rated as ○, whereas all the samples outside the scope of the invention were rated as x because these samples were inferior in either thermal conductivity or appearance. A detailed explanation of the results for the latter samples is as follows.

Samples Nos. 35, 39, and 43 were unable to be evaluated for sintered body properties because the calcined bodies had been insufficiently sintered. This is because the residual carbon contents in the calcined bodies were too high and the carbon inhibited sintering.

Samples Nos. 38, 42, and 46 had an extremely low thermal conductivity because AlN had turned into an oxide having a low thermal conductivity due to the too high calcining temperature. In addition, unevenness of color and bleeding occurred because that oxide had yielded YAG, which is rich in aluminum oxide, in the sintered bodies.

By satisfying the constitution described above, an aluminum nitride sintered body having high thermal conductivity and free from unevenness of color and bleeding can be obtained.

While the invention has been described in detail and with reference to specific embodiments thereof, it will be apparent to one skilled in the art that various changes and modifications can be made therein without departing from the spirit and scope thereof.

What is claimed is:

1. An aluminum nitride sintered body comprising aluminum nitride as a main component, a titanium compound, and an yttrium compound, wherein when the content of titanium and the content of yttrium both in terms of percentage by weight based on said aluminum nitride sintered body are plotted on an x-y coordinate system, with the titanium content as the x axis and the yttrium content as the y axis, the titanium content and the yttrium content each is within a region surrounded by the lines connecting points A and B, B and C, C and D, D and E, and E and A, inclusive of the lines, said points A, B, C, D and E being:

A (0.2, 2.0)
B (0.2, 6.5)
C (1.0, 10.25)
D (2.2, 10.25)
E (2.2, 5.0).

2. An aluminum nitride sintered body comprising aluminum nitride as a main component, a titanium compound, and an Y-Al-O compound, wherein when the content of oxygen and the content of yttrium both in terms of percentage by weight based on said aluminum nitride sintered body are plotted on an x-y coordinate system, with the oxygen content as the x axis and the yttrium content as the y axis, the oxygen content and the yttrium content each is within a region surrounded by the lines connecting points A and B, B and C, C and D, D and E, and E and A, exclusive of the lines, said points A, B, C, D and E being:

A (1.4, 1.7)
B (2.4, 6.4)
C (3.9, 10.25)
D (4.75, 10.25)
E (3.4, 4.9).

3. The aluminum nitride sintered body as claimed in claim 1, which has a thermal conductivity of 150 W/m·K or higher and has a black color that is uniform.

4. The aluminum nitride sintered body as claimed in claim 2, which has a thermal conductivity of 150 W/m·K or higher and has a black color that is uniform.

5. A process for producing an aluminum nitride sintered body which comprises mixing an aluminum nitride powder as a main ingredient with a titanium compound, an yttrium compound, and an organic binder, forming the mixture to prepare a green body, calcining the formed green body, and then sintering the calcined body in a non-oxidizing atmosphere, wherein said titanium compound and said yttrium compound are added in such amounts that when the titanium compound amount and the yttrium compound amount in terms of the amount of titania and the amount of yttria, respectively, per 100 parts by weight of said aluminum nitride powder are plotted on an x-y coordinate system, with the titanium compound amount as the x axis and the yttrium compound amount as the y axis both in terms of parts by weight, the titanium compound amount and the yttrium compound amount each is within a region surrounded by the lines connecting points A and B, B and C, C and D, D and E, and E and A, inclusive of the lines, said points A, B, C, D and E being:

A (0.4, 2.75)
B (0.4, 9.1)
C (2.0, 15.15)
D (4.2, 15.15)
E (4.2, 6.9).

6. The process as claimed in claim 5, wherein the calcining is conducted under such conditions that the calcined body has a residual carbon content of 0.3% by weight or lower.

7. A process for producing an aluminum nitride sintered body which comprises mixing an aluminum nitride powder as a main ingredient with a titanium compound, an yttrium (Y) compound, and an organic binder, forming the powder mixture to prepare a green body, calcining the formed green body, and then sintering the calcined body in a non-oxidizing atmosphere, said calcining being conducted under such conditions that the calcined body has a residual carbon content of 0.3% by weight or lower and that when the contents of oxygen and yttrium both in terms of percentage by weight in the calcined body are plotted on an x-y coordinate system, with the oxygen content as the x axis and the yttrium content as the y axis, the oxygen content and the yttrium content each is within the region surrounded by the lines connecting points A and B, B and C, C and D, D and E, and E and A, exclusive of the lines, said points A, B, C, D and E being:

A (1.85, 1.8)
B (2.9, 6.3)
C (4.4, 10.25)
D (5.3, 10.25)
E (4.1, 4.9).

* * * * *